United States Patent [19]

Allemann et al.

[11] Patent Number: 4,500,782

[45] Date of Patent: Feb. 19, 1985

[54] METHOD OF CALIBRATING ION CYCLOTRON RESONANCE SPECTROMETERS

[75] Inventors: Martin Allemann, Ottikon; Hanspeter Kellerhals, Uster, both of Switzerland

[73] Assignee: Spectrospin AG, Zürich-Fällanden, Switzerland

[21] Appl. No.: 405,558

[22] Filed: Aug. 5, 1982

[30] Foreign Application Priority Data

Aug. 11, 1981 [DE] Fed. Rep. of Germany ....... 3131669

[51] Int. Cl.[3] ...................... H01J 49/36; G01D 18/00

[52] U.S. Cl. .................................. 250/291; 250/252.1

[58] Field of Search ............................. 250/291, 252.1

[56] References Cited

PUBLICATIONS

Sharp et al., "Trapped Ion Motion . . . ", *Int. J. Mass Spectrom, Ion Phys.*, 9(1972) pp. 421–439.

Ledford et al., "Exact Mass Measurement . . . ", *Anal. Chem.*, vol. 52, No. 3, Mar. 1980, pp. 463–468.

Allemann et al., "A New Fourier-Transform Mass Spectrometer . . . ", *Chemical Physics Letters*, vol. 75, No. 2, Oct. 15, 1980, pp. 328–331.

Pendlebury et al., "Precision Field Averaging NMR Magnetometer . . . ", *Rev. Sci. Instrum.*, 50(5), May 1979, pp. 535–540.

*Primary Examiner*—Alfred E. Smith

*Assistant Examiner*—Jack I. Berman

*Attorney, Agent, or Firm*—Burmeister, York, Palmatier, Hamby & Jones

[57] ABSTRACT

In the calibration of ion cyclotron resonance spectrometers there may be used the first upper sideband of the resonance frequency of known sample substances because it was found that the frequency of the first upper sideband is approximately equal to the true cyclotron resonance frequency $\omega_c=(q/m)B$. If only one line is available for the calibration, the frequency $\omega_R$ of the first upper sideband is set equal to the true cyclotron resonace frequency $\omega_c$ in the relation $$\frac{q}{m}=\frac{\omega_R}{B}$$

which is used for calibration. If multiple lines are available, a more exact calibration is possible by using the relation $$\frac{q}{m}=\frac{\omega_R-\omega_{cor}}{B}$$

where $\omega_{cor}$ is a correction frequency. The effective resonance frequency $\omega_{eff}$ is separated from the upper sideband by a value $\Delta\omega$ which, in a good approximation, is independent of m/q. In determining the mass by way of the carrier line, an equation of the above type may be used wherein the displacement of the carrier line with respect to the sideband is taken into account by the term $\omega_{cor}$.

5 Claims, 4 Drawing Figures

Table 1

| Ion | m/q | $k_{exp}$ a) [Hz/V] | $\frac{k_{exp} - k_{theor}}{k_{theor}} \cdot 100\%$ |
|---|---|---|---|
| $H_2O^+$ | 18 | 90.4 | + 1.7 |
| $N_2^+$ | 28 | 88.8 | - 0.1 |
| $C_2Cl_4^+$ | 166 | 89.4 | + 0.7 |

a) obtained from ten values by the method of Least Squares

Table 2

| Calculated Mass [ AMU ] | Exper.Mass [ AMU ] | Error [ppm] | Exper.Mass [ AMU ] | Error [ppm] |
|---|---|---|---|---|
| 18.01002 | 18.01113 | -61.5 | 18.01003 | -.7 |
| 28.00560 | 28.00734 | -61.9 | 28.00562 | -.6 |
| 46.96831 | 46.97127 | -62.9 | 46.96834 | -.6 |
| 48.96535 | 48.96836 | -61.4 | 48.96530 | 1.0 |
| 81.93716 | 81.94254 | -65.6 | 81.93728 | -1.4 |
| 83.93421 | 83.93959 | -64.1 | 83.93419 | .2 |
| 93.93716 | 93.94319 | -64.2 | 93.93711 | .6 |
| 95.93421 | 95.94023 | -62.8 | 95.93401 | 2.1 |
| 97.93125 | 97.93799 | -68.9 | 97.93162 | -3.8 |
| 128.90602 | 128.91446 | -65.5 | 128.90587 | 1.2 |
| 130.90306 | 130.91166 | -65.7 | 130.90293 | 1.0 |
| 132.90010 | 132.90928 | -69.1 | 132.90039 | -2.2 |
| 163.87487 | 163.88558 | -65.3 | 163.87436 | 3.1 |
| 165.87191 | 165.88300 | -66.8 | 165.87162 | 1.8 |
| 167.86896 | 167.88084 | -70.8 | 167.86930 | -2.1 |
| 169.86600 | 169.87807 | -71.0 | 169.86638 | -2.2 |

Fig. 4

METHOD OF CALIBRATING ION CYCLOTRON RESONANCE SPECTROMETERS

FIELD OF THE INVENTION

This invention relates to a method of calibrating ion cyclotron resonance spectrometers having a trapped ion cell in which an ionized sample substance is subjected to the influence of a homogeneous magnetic field having a strength B, by measuring the resonance frequencies of predetermined species of ions having a well known charge-to-mass ratio q/m.

BACKGROUND OF THE INVENTION

It has been described by T. E. Sharp, J. R. Eyler and E. Li in Int. J. Mass Spectr. Ion Phys. 9 (1972) 421, for example, that the effective cyclotron resonance frequency $\omega_{eff}$ is not identical with the true cyclotron resonance frequency $\omega_c$, which is equal to the product of the charge-to-mass ratio q/m and the magnetic field strength B. Rather, the effective cyclotron resonance frequency is a function of the true cyclotron resonance frequency $\omega_c$ and the frequency $\omega_t$ of oscillations of the ions in the direction of the magnetic field inside the trapped ion cell. The latter frequency, in turn, depends on the potentials applied to the trapped ion cell, the geometry of the trapped ion cell and, again, the charge-to-mass ratio. The complex functions involved necessitate the creation of a calibration curve for each spectrometer and require frequent repetition of the calibration procedure because of variations in the electric fields inside the trapped ion cell, particularly in terms of time, which are prone to lead to alterations in the calibration curve.

It is also a disadvantage that the functional relationship between the effective resonance frequency $\omega_{eff}$ and the charge-to-mass ratio is very complicated so that a great number of calibration points are required to produce a sufficiently accurate curve. Attempts made heretofore to find approximations suitable for producing calibration curves have proven unsatisfactory so far. Thus, Ledford et al., for example, use a calibration function with three parameters; this function, however, yields an accuracy of only 3 ppm in the very small range of mass-to-charge ratio of 117 to 135 (Anal. Chem. 52 (1980) 463).

SUMMARY OF THE INVENTION

It is the object of the present invention to provide a method of calibrating ion cyclotron resonance frequency spectrometers by which extremely accurate results are obtained with only a few measurements.

This is accomplished according to the invention, in its simplest embodiment, by determining the frequency $\omega_R$ of the first upper sideband of the resonance frequency of a given ion species and using the relation $$\frac{q}{m} = \frac{\omega_R}{B}$$

for the calibration.

It has been found that the frequency of the first upper sideband of the resonance frequency is equal to the true cyclotron resonance frequency to a degree of accuracy which is sufficient for many purposes, so that the calibration curve is a straight line of slope 1/B. The effective value of the magnetic field strength in the trapped ion cell can be computed from measuring q/m and $\omega_R$.

Thus, a single measurement is sufficient to obtain a calibration curve whose accuracy matches that of previously obtained curves, and may even surpass it, at least in the area of the calibration point.

If a plurality of lines of known charge-to-mass ratio are available, a variation of the method according to the invention proposes to employ the relation $$\frac{q}{m} = \frac{\omega_R - \omega_{cor}}{B}$$

where $\omega_{cor}$ is a correction frequency. In this case, two measurements are sufficient to determine the constants B and $\omega_{cor}$. This linear function produces a very high degree of accuracy of calibration over the entire measuring range of the spectrometer.

If more than two known species of ions are available for the calibration procedure, a larger number of calibration points may be used to determine the constants B and $\omega_{cor}$ by the method of Least Squares. This determination at the same time permits to estimate the measuring error.

The calibration curves obtained as described in the foregoing can easily be used to determine unknown charge-to-mass ratios if in the study of unknown sample substances the first upper side band of the resonance frequency is used. However, by applying the calibrating method according to the invention, it is also possible to determine the carrier or center resonance frequency, because the differential frequency $\Delta\omega$ between the frequency $\omega_R$ of the upper sideband and the effective resonance frequency $\omega_{eff}$ is, in a good approximation, independent of the charge-to-mass ratio across a wide mass range and, therefore, is essentially an apparatus constant. Thus, according to a further embodiment of the inventive method, instead of measuring the frequency $\omega_R$ of the upper sideband, it is sufficient to measure the resonance frequency $\omega_{eff}$ of the known lines and for the calibration use the equation $$\frac{q}{m} = \frac{\omega_{eff} + \omega'_{cor}}{B}$$

where $\omega'_{cor}$ again is a correction frequency. The thus obtained curve has the same characteristic as the curve obtained by measuring the frequency of the upper sideband except that it is displaced parallel to the upper sideband curve by the constant differential $\Delta\omega$ between the major peaks and the upper sidebands. This displacement $\Delta\omega$ is included in the term $\omega'_{cor}$.

The invention is based on the following theoretical considerations:

The ions in the trapped ion cell move under the influence of an inhomogeneous electrostatic field and a homogeneous magnetic field. Consequently, ion motion is a superposition of cyclotron and drift components perpendicular to the magnetic field and further includes components which are due to the constraining effect of the trapped ion cell and are parallel to the magnetic field.

To describe the ion motion near the center of a trapped ion cell, a three-dimensional quadrupole approximation of the electric field has been found useful (Sharp et al., Int. J. Mass Spectr. Ion Phys. 9 (1972) 421). The following equation applies:

$$V(x,y,z) = \tfrac{1}{2}(V_t + V_o) + (V_t - V_o)\left[-\alpha\left(\frac{x}{a}\right)^2 - \lambda\left(\frac{y}{a}\right)^2 + \beta\left(\frac{z}{a}\right)^2 - \gamma\right]. \quad (1)$$

In this equation, $V_t$ is the trapping potential and $V_o$ is the potential applied to the other four plates of the cell; a is the plate separation in the x-direction; $\alpha,\beta,\lambda$ and $\gamma$ are constants which depend on the geometry of the trapped ion cell, whereby for a cell having identical dimensions in the x and y direction the relationship $$\alpha = \lambda \mp \beta/2 \quad (2)$$

applies.

Using equation (1), the motion of a single ion in vacuo under the influence of the electric and magnetic fields may be described by a system of three linear differential equations of order two which can easily be solved. The motion of the ions parallel to the magnetic field (z-direction) may be evaluated separately. It takes the form of an harmonic oscillation having a frequency $$\omega_t = \left[\frac{2\beta q}{ma^2}(V_t - V_o)\right]^{\frac{1}{2}} \quad (3)$$

where m is the mass and q is the charge of the ion.

There remain two simultaneous differential equations which can be converted into a new system of first-order differential equations in four unknowns. The corresponding natural frequencies (Eigenfrequenzen) may be determined by diagonalizing a 4×4 matrix (K. Hepp, Lectures on Mechanics, ETH Zürich 1974/75). The resulting effective cyclotron frequency is $$\omega_{eff} = (\omega_c^2 - \omega_t^2)^{\frac{1}{2}} \quad (4)$$

where $\omega_c = (q/m)B$. The drift frequency is $$\omega_D = \frac{2(\alpha\lambda)^{\frac{1}{2}}}{a^2B}(V_t - V_o). \quad (5)$$

It is also possible to make a projection as to the frequency of the receiver signal produced by the ion cyclotron resonance spectrometer, the trapped ion cell of which holding ions of identical mass m. If the distribution of the ions about the z-axis, which coincides with the direction of the magnetic field, fails to be completely symmetrical, the ion density will change along with the frequency $\omega_D$. Thus, the output signal of the receiver is $$U(t) = U_o \sin \omega_{eff} t(1 + \epsilon \sin \omega_D t). \quad (6)$$

It will be noted that the output signal U(t) of the receiver, then, is an alternating voltage having a frequency $\omega_{eff}$ which is modulated by the frequency $\omega_D$. A simple transformation yields $$U(t) = U_o \sin\omega_{eff} \cdot t - \frac{U_o\epsilon}{2}\cos(\omega_{eff} + \omega_D)t + \quad (7)$$

-continued $$\frac{U_o\epsilon}{2}\cos(\omega_{eff} - \omega_D)t$$

The Fourier transformation yields a carrier frequency $\omega_{eff}$ having two symmetrical sidebands $\omega_{eff} \pm \omega_D$.

The upper sideband has the frequency $$\omega_R = \omega_{eff} + \omega_D = (\omega_c^2 - \omega_t^2)^{\frac{1}{2}} + \omega_D \quad (8)$$

Substituting equations (3) and (5) into (8) and expanding the square roots yields $$\omega_R = \omega_c + \frac{(V_t - V_o)}{a^2b}[2(\alpha\lambda)^{\frac{1}{2}} - \beta] = \omega_c + \omega_{cor} \quad (9)$$

If equation (2) is satisfied, $\omega_{cor} = 0$ and, consequently, $$\omega_R = \omega_c = \frac{qB}{m} \quad (10)$$

Although real cells will satisfy equation (9) only approximately at the most, $\omega_{cor}$ is still very small also for cells of this type as compared to $\omega_c$, so that equation (10) is a good approximation. Thus, equation (10) denotes the relationship which is used for calibration when only one line having a known charge-to-mass ratio is available. In this case, then, the frequency of the first upper sideband is set equal to the resonance frequency $\omega_R$ of the true or nominal cyclotron resonance frequency $\omega_c$. Equation (9) can be written in the alternative form $$\frac{Q}{m} = \frac{\omega_R - \omega_{cor}}{B} \quad (11)$$

to represent the previously given relationship. By including the correction term $\omega'_{cor}$ more accurate results are obtained where two or more lines of known charge-to-mass ratio are available.

Equation (5) shows that the drift frequency $\omega_D$ is independent of the charge-to-mass ratio and is therefore an apparatus constant. Equation (11) may thus be rearranged by taking equation (8) into account and then becomes $$\frac{Q}{m} = \frac{\omega_{eff} + \omega_D - \omega_{cor}}{B} = \frac{\omega_{eff} + \omega'_{cor}}{B} \quad (12)$$

BRIEF DESCRIPTION OF THE DRAWINGS

In the following, the method according to the invention will be described in further detail with reference to some of the measuring results obtained in practice and to the diagrams and tables represented in the drawings, in which:

FIG. 4 shows tables of comparative values of measured and actual mass-to-charge ratios of various ion species.

DETAILED DESCRIPTION OF ILLUSTRATIVE EMBODIMENTS

Figure 1:
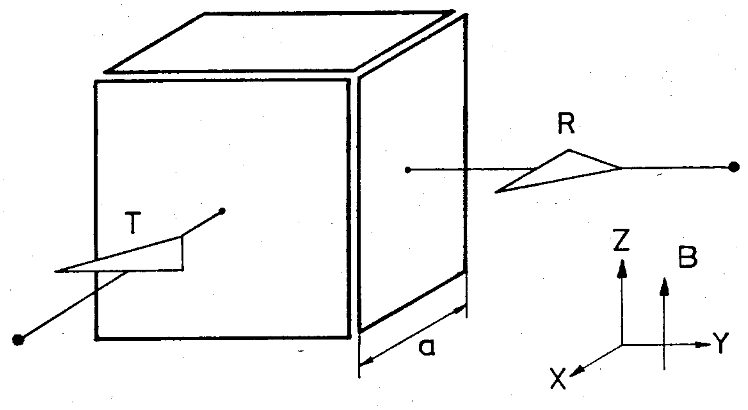
FIG. 1 is a schematic diagram of the trapped ion cell of the ICR.

The measurements described in the following were carried out in the Fourier transformation mode with an ion cyclotron resonance spectrometer as described by M. Allemann et al. in Chem. Phys. Lett. 75 (1980) 328. A superconductive 4.7 T-magnet having a wide bore was employed. The exact magnetic field strength was measured with an NMR probe. The geometry of the trapped ion cell was nearly cubic, having a volume of about 27 $cm^3$. In order to obtain reproduceable results, this cell required to be cleaned with extreme care. All measurements were performed at a total pressure of about $1.5\times10^{-8}$ Torr. To determine the dependency of the resonance signals from the voltages applied to the trapped ion cell, both voltages were varied at the same time. The basic construction of the trapped ion cell, including a transmitter T and a receiver R, and the direction of the applied magnetic field B, are schematically illustrated in FIG. 1.

Figure 2:
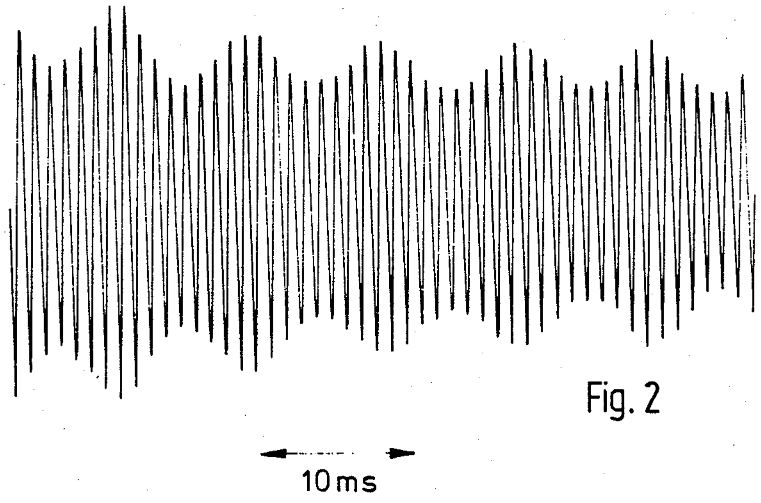
FIG. 2 is a diagram of the transient signal of $N_2^-$ ions.

The signal of coherently excited $N_2{}^+$ ions having a mass-to-charge ratio of 28, as it was observed at the receiver plate of the ICR spectrometer, is represented in FIG. 2. The expected amplitude modulation is prominent and, upon Fourier transformation, yields a carrier line with two sidebands at a separation of $\Delta\omega=\omega_R-\omega_{eff}=\omega_{eff}-\omega_L$ if $\omega_L$ is the frequency of the lower sideband.

Figure 3:
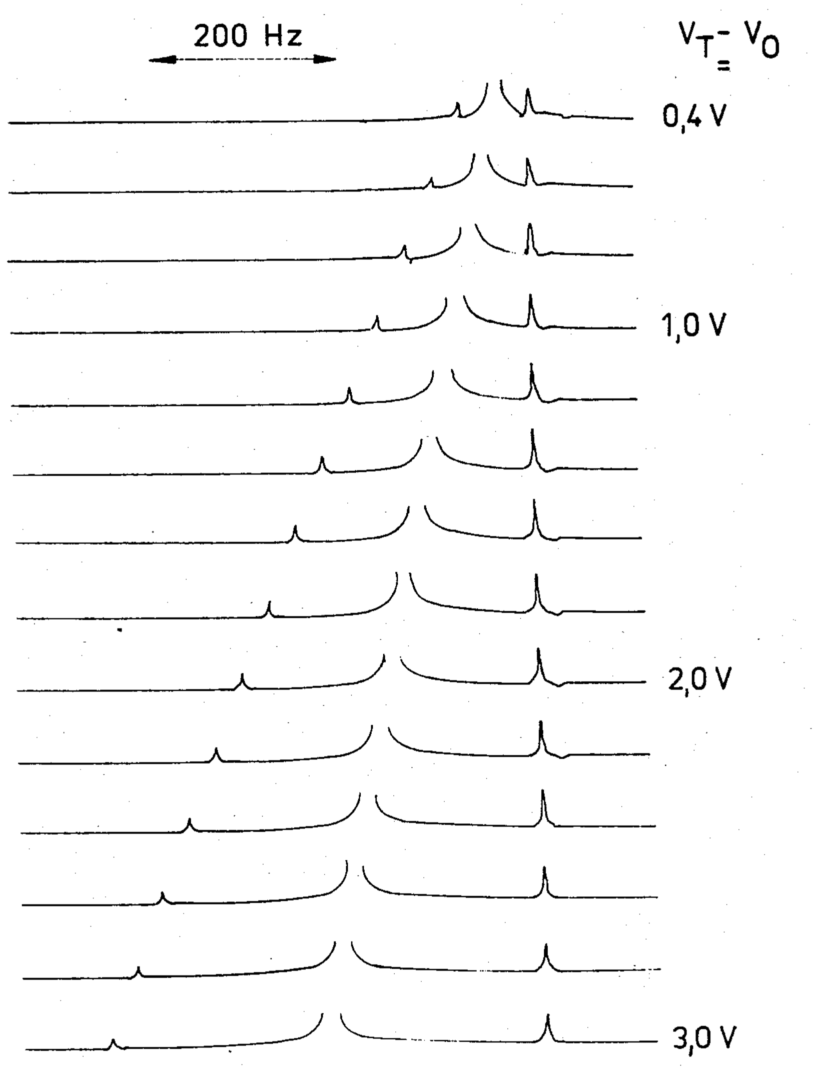
FIG. 3 is a diagram of the resonance frequencies of $N_2^+$ ions as a function of the potentials applied to the trapped ion cell.

The same sidebands were obtained when the spectrometer was operated in the rapid scanning mode. Experiments with gas mixtures in the m/q range of 18 to 170 have shown that the differential frequencies $\Delta\omega$ do not depend on the charge-to-mass ratio. The intensities of the sidebands usually are less than 5% of the intensity of the center line and tend to increase easily with an increase in the total number of ions in the cell. FIG. 3 illustrates as a typical example the center lines and sidebands of $N_2{}^+$ ions. Resolution is $1.5\times10^6$ with respect to the line width at half height. FIG. 3 also shows the dependency of distance $\Delta\omega$ of the sidebands from the center line upon the potentials applied to the trapped ion cell, namely, $V_t-V_o$. It will be seen that the position of the right hand sideband is not changed.

To permit a comparison between experimental and theoretical values, the coefficients $\alpha$, $\beta$ and $\lambda$ were calculated. For the cell used, $\alpha=1.574$, $\beta=2.999$ and $\lambda=1.425$. Thus, it is possible to compare the values $k_{exp}$ and $k_{theor}$, which are defined by the following equations and should be identical:

$$k_{exp} = \frac{\Delta\omega}{(V_t - V_o)} \quad (13)$$

$$k_{theor} = \frac{2\,(\alpha\lambda)^{\frac{1}{2}}}{a^2 B} = 88.9 \text{ Hz/V} \quad (14)$$

Table 1 of FIG. 4 shows that a good agreement has been achieved.

To calculate exact masses, the magnetic field in the vacuum chamber, in place of the ICR cell, was determined to have a strength B=4.695 957 T, taking into account the corrections as proposed by J. M. Pendlebury, Rev. Sci. Instrum. 50 (1979) 535. The experimental results in the 18 to 170 range of the mass-to-charge ratio were determined by addition of the atomic masses and subtraction of the electron masses, as shown in column 1 of Table 2 in FIG. 4. The difference between the values experimentally determined in accordance with equation (10) and the calculated values amounts to approximately 60 ppm in the lower mass range and to approximately 70 ppm at m/q values in the range of 170 (see Table 2, columns 2 and 3). A better agreement is achieved when B and $\omega_{cor}$ are selected as free parameters and are determined from a number of experimental data by the Least Squares method. The results obtained on the basis of such experimental data are shown in column 4 of Table 2. It will be noted that these data are in good agreement with the calculated values in the mass range studied. The mean error amounts to merely 1.5 ppm, even though only two parameters were used in the calibration. The same experiments were repeated a few days later to test the stableness of the instrument. The set of parameters was optimized for the first experiment in the described manner and was used to compute the experimental mass values for the second experiment. The set of parameters was still usable and the mean error increased only slightly to 2 ppm.

The foregoing results may be compared with the previously mentioned results obtained by Ledford et al. Ledford used for his instrument equipped with an electromagnet a calibration function having an $m^4$ member and three parameters. The accuracy achieved was an average of 3 ppm in the very small mass range of m/q=117 to 135.

The experiments performed as described herein confirm that in a calibration procedure using two parameters in accordance with the invention, the calibration curve produced is subject to only minor variations as to time, so that this more accurate calibration need to be repeated only at intervals of a few days to several weeks.

We claim:

1. A method of measuring the charge-to-mass ratio q/m of an ionized sample substance in a cyclotron resonance spectrometer, in which the ionized sample substance is contained in a trapped ion cell and is exposed therein to a homogeneous magnetic field of constant strength, comprising the steps of initially introducing a known ionized substance having a known charge-to-mass ratio into said ion cell, measuring the first upper sideband frequency $\omega_R$ of the resonance frequency of said known ionized substance, deriving the calibration factor B of the spectrometer by introducing the known value of q/m and the measured value of $\omega_R$ into the approximate relation $$\frac{q}{m} = \frac{\omega_R}{B};$$

thereafter introducing an unknown sample substance into said cell, measuring the first upper sideband frequency $\omega_R$ of the resonance frequency thereof, and deriving the unknown value of q/m by introducing the measured value of $\omega_R$ and the calibration value of B into the same approximate relation.

2. A method of measuring the charge-to-mass ratio q/m of an ionized sample substance in a cyclotron resonance spectrometer, in which the ionized sample substance is contained in a trapped ion cell and is exposed therein to a homogeneous magnetic field of constant strength, comprising the steps of initially introducing a first known ionized substance having a first known value of q/m into said ion cell, measuring the first upper sideband frequency $\omega_R$ of the resonance frequency of said first known ionized substance to produce a first measured value of $\omega_R$, separately introducing a second known ionized substance having a second known value of q/m into said ion cell, measuring the first upper sideband frequency $\omega_R$ of the resonance frequency of said second known ionized substance to produce a second measured value of $\omega_R$, deriving the calibration factor B and a constant calibration correction frequency $\omega_{cor}$ of the spectrometer by introducing the first and second known values of q/m and the first and second measured values of $\omega_R$ into first and second simultaneous versions of the relation $$\frac{q}{m} = \frac{\omega_R - \omega_{cor}}{B};$$

solving said simultaneous versions of said relation for the calibration values of B and $\omega_{cor}$;

thereafter introducing an unknown sample substance into said cell, measuring the first upper sideband frequency $\omega_R$ of the resonance frequency thereof, and deriving the unknown value of q/m by introducing the measured value of $\omega_R$ and the calibration values of B and $\omega_{cor}$ into the same approximate relation.

3. A method according to claim 2, in which more than two known ionized substances having known values of q/m are separately employed initially in measuring more than two values of the first upper sideband frequency $\omega_R$, said values then being utilized in deriving the calibration constants B and $\omega_{cor}$ by the method of Least Squares.

4. A method of measuring the charge-to-mass ratio q/m of an ionized sample substance in a cyclotron resonance spectrometer, in which the ionized sample substance is contained in a trapped ion cell and is exposed therein to a homogeneous magnetic field of constant strength, comprising the steps of initially introducing a first known ionized substance having a first known value of q/m into said ion cell, measuring the frequency $\omega_{eff}$ of the carrier line of the resonance frequency of said first known substance to produce a first measured value of $\omega_{eff}$, separately introducing at least a second known ionized substance having a second known value of q/m into said ion cell, measuring the frequency $\omega_{eff}$ of the carrier line of the resonance frequency of said second known substance to produce a second measured value of $\omega_{eff}$, deriving the calibration factor B and a constant calibration correction frequency w'hd cor by introducing the first and second known values of q/m and the first and second measured values of $\omega_{eff}$ into first and second simultaneous versions of the approximate relation $$\frac{q}{m} = \frac{\omega_{eff} + \omega'_{cor}}{B};$$

solving said simultaneous versions of said relation for the calibration constant B and the calibration constant correction frequency $\omega'_{cor}$;

thereafter separately introducing an unknown sample substance into said cell, measuring the frequency $\omega_{eff}$ of the carrier line of the resonance frequency thereof, and deriving the unknown value of q/m by introducing the measured value of $\omega_{eff}$ and the calibration values of B and $\omega'_{cor}$ into the same approximate relation.

5. A method according to claim 4, in which more than two known ionized substances having known values of q/m are separately employed initially in said cell for obtaining more than two measured values of $\omega_{eff}$, said measured values then being employed in determining the calibration constants B and $\omega'_{cor}$ by the method of Least Squares.

* * * * *